United States Patent [19]
Megahed et al.

[11] Patent Number: 5,497,453
[45] Date of Patent: Mar. 5, 1996

[54] METHOD AND APPARATUS FOR DETECTING AND VISUALIZING INTERFERENCES BETWEEN SOLIDS

[75] Inventors: Abraham E. Megahed, Madison, Wis.; Jarolsaw R. Rossignac; Bengt-Olaf Schneider, both of Ossining, N.Y.

[73] Assignee: International Business Machines Corporation, Armonk, N.Y.

[21] Appl. No.: 957

[22] Filed: Jan. 5, 1993

[51] Int. Cl.⁶ ............................................. G06F 15/00
[52] U.S. Cl. .................... 395/122; 395/127; 395/124
[58] Field of Search ........................... 395/122, 119, 395/120, 124, 127, 129, 135

[56] References Cited

U.S. PATENT DOCUMENTS

| | | | |
|---|---|---|---|
| 4,649,498 | 3/1987 | Kedem et al. | 364/518 |
| 4,729,098 | 3/1988 | Cline et al. | 395/124 |
| 4,809,201 | 2/1989 | Keklak | 364/518 |
| 4,888,707 | 12/1989 | Shimada | 364/513 |
| 4,901,252 | 2/1990 | Fitzgerald et al. | 364/522 |
| 4,984,157 | 1/1991 | Cline et al. | 395/124 |
| 4,989,152 | 1/1991 | Cheng | 364/474.24 |
| 5,014,230 | 5/1991 | Sinha et al. | 364/578 |
| 5,027,292 | 6/1991 | Rossignac et al. | 395/122 |
| 5,113,357 | 5/1992 | Johnson et al. | 395/124 |
| 5,113,451 | 5/1992 | Chapman et al. | 382/8 |
| 5,268,997 | 12/1993 | Funaki | 395/127 |

FOREIGN PATENT DOCUMENTS

| | | | |
|---|---|---|---|
| 0324307A2 | 7/1989 | European Pat. Off. | G06F 15/72 |

OTHER PUBLICATIONS

Research Report "Z-Buffer Rendering from CSG: The Trickle Algorithm", Epstein et al. RC 15182 (#67629) Nov. 22, 1989, Computer Science, IBM Research Division, pp. 1–17.

"Correct shading of regularized CSG solids using a Depth–interval Buffer" Jarek Rossignac and Jeffrey Wu, Interactive Geometric Modeling, IBM T. J. Watson Research Center Fifth Eurographics Workshop on Graphics Hardware, Sep., 1990, pp. 1–18 FIG. 6a–61.

"Depth–Buffering Display Techniques for Constructive Solid Geometry", Rossignac et al. Sep. 1986, IEEE, pp. 29–39.

"Near Real–Time CSG Rendering using Tree Normalization and Geometric Pruning", Jack Goldfeather et al., University of North Carolina, 11 Jan. 1988, pp. 1–22.

*Primary Examiner*—Heather R. Herndon
*Assistant Examiner*—Cliff N. Vo
*Attorney, Agent, or Firm*—Perman & Green

[57] ABSTRACT

Methods and apparatus for automatically detecting and visually highlighting interference areas of a cross-section through displayed representations of solids. As a cross-sectioning plane (C) sweeps space, interferences between any pairs of solids are visualized, in a highlighted fashion, together with the cross-sections of the solids. The invention also automates the detection, in three dimensions, of regions of interferences. In response to an input, a cross-sectioning plane is initially positioned and a search process is begun. The invention automatically locates a beginning of a three-dimensional interference region along a search direction having a predetermined orientation with the cross-sectioning plane. If an interference is located, a user may analyze the interference interactively through the use of cross-section highlighting. The system positions the cross-sectioning plane automatically at the beginning of the detected interference region so as to facilitate the inspection. During the search for interferences, the scene is recursively cut into thinner and thinner slices, until it can be established that the slice is free of intersections, or until a minimum slice thickness is reached.

21 Claims, 9 Drawing Sheets

METHOD AND APPARATUS FOR DETECTING AND VISUALIZING INTERFERENCES BETWEEN SOLIDS

FIELD OF THE INVENTION

This invention relates to methods and apparatus for rendering representations of objects for display on a graphics display device.

BACKGROUND OF THE INVENTION

Several functions play an important role in the computerized detection of design errors in mechanical assemblies. These include: (1) an intuitive and interactive navigation through the model allowing the visual inspection of any portion of the assembly, (2) the display of user-specified cross-sections through the assembly, so as to reveal internal structures and mating conditions between assembly components, (3) automated facilities for detecting and rendering interferences between any two parts, and (4) facilities for simulating motions in mechanisms and in assembly or disassembly procedures.

As high-performance graphics workstations extend real-time shading and animation capabilities to larger data sets, and as virtual reality techniques make navigation through Computer Aided Design (CAD) models more intuitive, the visual inspection of assembly designs on CAD systems becomes an acceptable alternative to the conventional use of clay models, except for the limited support of cross-section and interference calculations. Although the availability of an informationally complete solid modeling representation of each assembly component permits the automatic calculation of cross-sections and the detection and calculation of interferences, current implementations of these functions rely on computationally expensive geometric operations, which, when applied to models of typical industrial complexity, increase the systems response beyond tolerable limits for interactive sessions. Thus, designers must either abandon interactivity or try to detect interferences manually using standard shaded or wireframe pictures, without being able to visualize the cross-sections necessary for understanding how components fit together in tight assemblies.

Ideally, to reduce the cost of correcting design errors assemblies of mechanical parts are modeled using CAD systems and then verified electronically before the designs are fabricated. However, the conventional shaded images that are displayed to a designer are generally insufficient for examining the internal structures of assemblies and for detecting interferences between mechanical parts. As a result, designers must often rely on computationally intensive numerical techniques that compute geometric representations of cross-sections and of intersections of solids.

In greater detail, solid models of the component mechanical parts are usually represented by their bounding faces, and interferences are detected and constructed by computing the geometric intersections of the faces of each object with all the faces of all other objects. However, software implementations of these computations are slow and often unreliable.

Efficient hardware/software architectures for rendering the visible subsets of the solids' faces are available, and provide effective support for scan converting faces to generate pixel information, thereby reducing the three-dimensional visibility problem into a series of one-dimensional problems to be solved independently at each pixel.

Scan-conversion is a well-known technique that generates surface points that project onto individual screen pixels along the viewing direction. The depth of the three dimensional points, computed along the viewing direction away from the viewer, may be stored in a z-buffer (depth) memory associated with the corresponding pixel.

Intersections between pairs of solids may be determined by various techniques. A geometric approach evaluates the boundary of the regularized Boolean intersection of the two solids. Although asymptotically efficient computational geometry techniques for finding the minimum distance between two polyhedra are available, these numeric approaches are generally too computationally expensive for interactive inspection and are better employed during the final stages of assembly verification.

Two hardware-assisted graphic techniques are relevant to interference detection: (1) a discretized (ray casting) approach reduces interference detection to a series of one-dimensional interval-intersection tests and is supported by special-purpose ray-casting hardware, and (2) the ability to automatically select and report which of the scan-converted objects interfere with an application-defined block. This latter technique provides a mechanism for eliminating unnecessary interference calculations. For example, solids may be efficiently identified that are clearly disjoint from any solid S because they are disjoint from a box containing S.

In that geometric techniques are generally too computationally expensive, and ray-casting hardware is not at present commercially available, and boxing techniques provide only a necessary condition for interference; an object of this invention is to provide a method for efficiently and rapidly detecting and displaying interferences between representations of solid objects.

A further object of this invention is to provide a method that exploits a reduction to one-dimensional calculations for all pixels for the purpose of detecting interference regions and for displaying the interference regions.

A still further object of this invention is to provide methods and apparatus for detecting and displaying interferences between representations of solid objects, the method and apparatus operating at speeds that support interactive use.

SUMMARY OF THE INVENTION

A first aspect of the present invention automatically highlights interference areas of a cross-section, and thus supports interactive design review where a designer manually controls the position of a cross-sectioning plane. As the cross-sectioning plane sweeps space, the interferences between any pairs of solids are visualized, in a highlighted fashion, together with the cross-sections of the solids.

A second aspect of the present invention automates the detection, in three dimensions, of regions of interferences. A cross-sectioning plane is initially positioned and a search process is begun. The system automatically locates a beginning of a three-dimensional interference region along a search direction that has a predetermined orientation to the cross-sectioning plane. If no interference region is found, the assembly is free from design errors that would result in interferences.

If an interference is located, a user may analyze the interference interactively through the use of the cross-section highlighting technique referred to above. The system automatically positions the cross-sectioning plane at the beginning of the detected interference region so as to facilitate the inspection.

The teaching of this invention utilizes a projective approach for automatic interference detection which is assured to locate all possible interferences, as opposed to an analysis of a series of cross-sections, which would fail to detect interferences located between two consecutive cross-sections.

In this projective approach, the scene is recursively cut into thinner and thinner slices until it can be established that the slice is free of intersections, or until a minimum slice thickness is reached.

The intersection of each component with a particular slice is projected onto a cutting plane. If two such projections overlap, there is a potential interference, in which case the slice is divided into two smaller slices and the process repeated.

Hardware-assisted techniques for efficiently computing these projections and for detecting their interferences are also disclosed.

A further aspect of this invention detects those situations where a slice is free from interferences, but where the projections of the components overlap. The projections' interference test is replaced with a finer disjointness test. Given two constituent solids, the disjointness test checks at each pixel whether, within the slice, one constituent is entirely in front of the other constituent. If this is the case for all pixels, the two solids do not interfere within the slice. The disjointness test is performed using extensions to a depth-buffer approach to hidden-surface removal. Namely, if at a given pixel the furthest point (along a given direction) of one solid, within the slice, is in front of the closest point of the other solid, the two solids are disjoint for that pixel.

In addition to performance improvements, the above described aspect of this invention facilitates the processing of pairs of touching, but non-interfering solids. When seen from an arbitrary angle, such a contact zone could result in overlapping projections, regardless of the thickness of the slice. The disjointness test provides control over the depth tolerance, which may then be employed to discard contact regions and report only true interference regions.

In that the method of this invention performs calculations at a discrete set of points (pixels), it must be insured that no interference occurring between pixels is missed.

A further aspect of this invention therefore provides a solution based on a combination of face rendering and edge-drawing that utilizes a width of three pixels. Consequently, when the projections of two objects are only one pixel apart, the additional thickness of the edge drawing will create an overlapping projection.

Furthermore, in that interferences may be due to numerical round-off errors during scan-conversion, the teaching of this invention provides a method for eliminating such interferences by employing filters with pixel masks that result from the interference analysis. These filters discard interference areas that are below a predetermined size. A comparison of the thick line interference test with the filtering method, using the additional depth-separation test with an appropriate tolerance, differentiates between true interferences, contacts, and disjointness between two solids.

BRIEF DESCRIPTION OF THE DRAWINGS

The above set forth and other features of the invention are made more apparent in the ensuing Detailed Description of the Invention when read in conjunction with the attached Drawings, wherein:

FIG. 1b is a block diagram that illustrates in greater detail the Graphics Buffer unit of FIG. 1a;

FIG. 2a illustrates a mechanical assembly as it would be displayed upon the screen of the display device of FIG. 1a;

DETAILED DESCRIPTION OF THE INVENTION

The teaching of this invention assumes that a mechanical assembly should be free from interferences, but may contain lower-dimensional contact regions between components. An interference between two solids is a region where the solids intersect. More precisely, an interference region between two solids A and B is defined as their regularized intersection: (Aη*B). A contact between two solids is given by ((AηB)−(Aη*B)), the set theoretic difference between their set theoretic intersection and their regularized intersection.

Figure 1A:
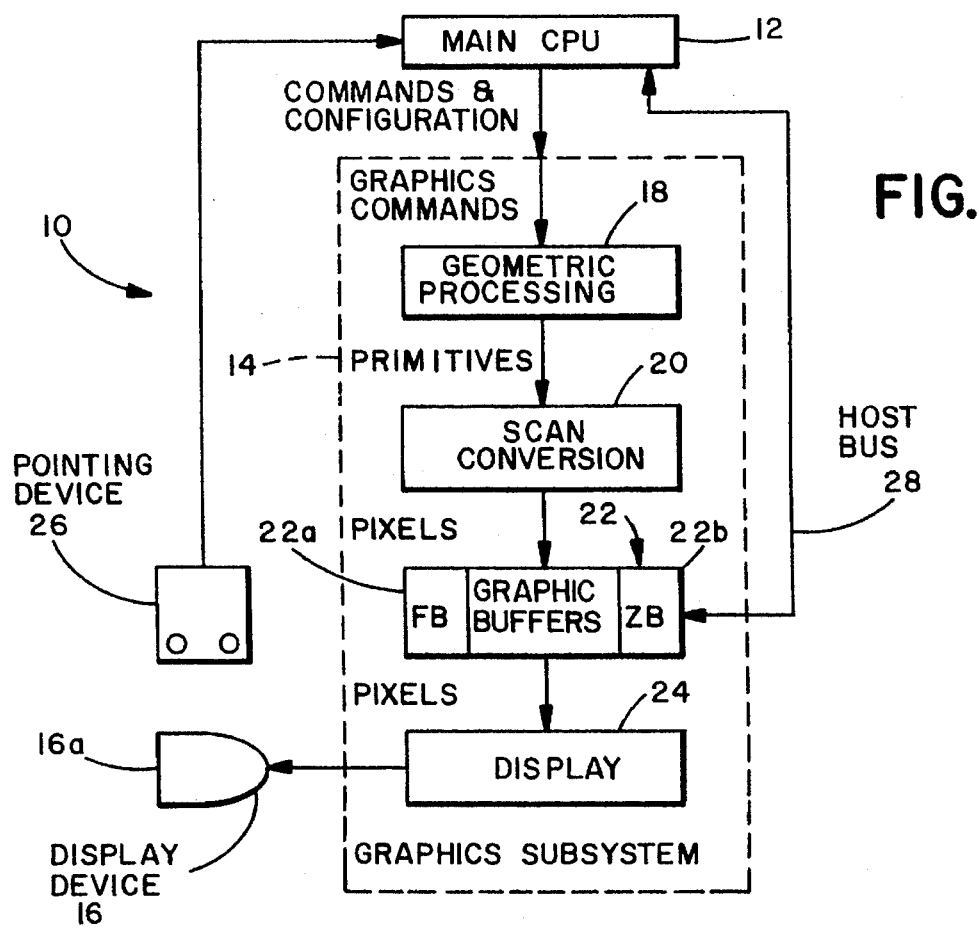
FIG. 1a is a block diagram of a graphics rendering system that is suitable for practicing the invention.

A raster graphics system 10, as illustrated in FIG. 1a, includes a main (Host) processor 12 and a graphics subsystem 14. The Host processor 12 executes an application program and dispatches graphics tasks to the graphics subsystem 14.

The graphics subsystem 14 includes several components that perform operations necessary to prepare geometric entities for display on a raster display device 16. For the purposes of describing the invention, a model of the graphics subsystem 14 is employed that contains the following functional units. It should be realized that this particular model is not to be construed in a limiting sense upon the practice of the invention.

A Geometric Processing unit 18 performs geometric and perspective transformations, as well as clipping against screen (window) boundaries. The resulting graphics primitives, e.g. vertices, lines, triangles, etc., are described in screen space coordinates.

A Scan Conversion (Rasterization) unit 20 breaks down the graphics primitives into raster information, i.e. a description of display screen pixels that are covered by the graphics primitives.

A Graphics Buffer unit 22 receives, stores and performs operations on the pixels. The Graphics Buffer unit 22 includes a frame buffer (FB) 22a and at least one depth buffer, or z-buffer (ZB) 22b. A more detailed description of the Graphics Buffer unit 22 is given below with respect to FIG. 1b.

A Display unit 24 receives pixels from the Graphics Buffer unit 22, specifically the FB 22a, and transforms these pixels into information displayed on the output device 16, typically a raster screen 16a.

Also provided is a user input device, such as a pointing device 26 and/or a conventional keyboard (not shown). The pointing device 26 is employed by the user to position one or more cut planes at a desired location relative to displayed solids, as described below, and to otherwise interact with the system 10.

For the purposes of describing the invention it is assumed that solids are described as polyhedra, i.e. by their bounding polygons. Each of the polygons is represented as an ordered list of vertices. However, the invention is not limited for use only with bounding polygons. That is, the boundaries of a solid can be of arbitrary type, such as algebraic surfaces, B-spline surfaces, NURBS surfaces, voxel surfaces, etc. As such, the described method is independent of the type of surfaces bounding the solid. For simplicity, it will be assumed that the solid is bounded by planar polygons, i.e. the solid is a polyhedron. Also, the method is generally described in the context of a front clipping plane that is perpendicular to the depth, or z-axis. However, and as will be made apparent, the method is also well suited to clip against arbitrarily located clipping planes having any orientation to the z-axis, and with combinations of clipping planes that define complex clipping surfaces.

Figure 2A:
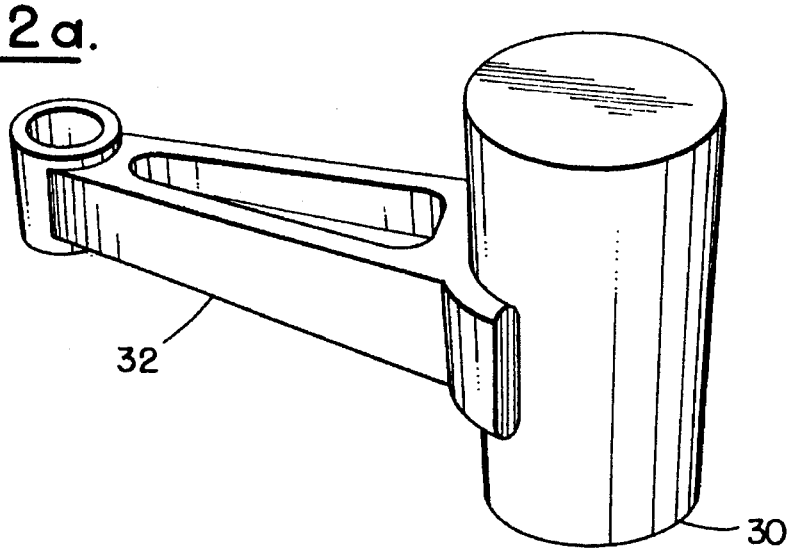

Furthermore, the term "solid" or "solid object", as employed herein, is intended to encompass objects that are completely filled with material, such as a ball bearing, and also objects that are only partially filled with material, such as an engine block. By example, FIG. 2a illustrates a CAD generated mechanical assembly as it would be displayed upon the screen 16a of the display device 16 of FIG. 1a. In this representation, the assembly consists of two solids, specifically a cylinder 30 and a connecting rod 32. An interference between the cylinder 30 and the connecting rod 32 is not visually apparent in this representation.

Figure 2B:
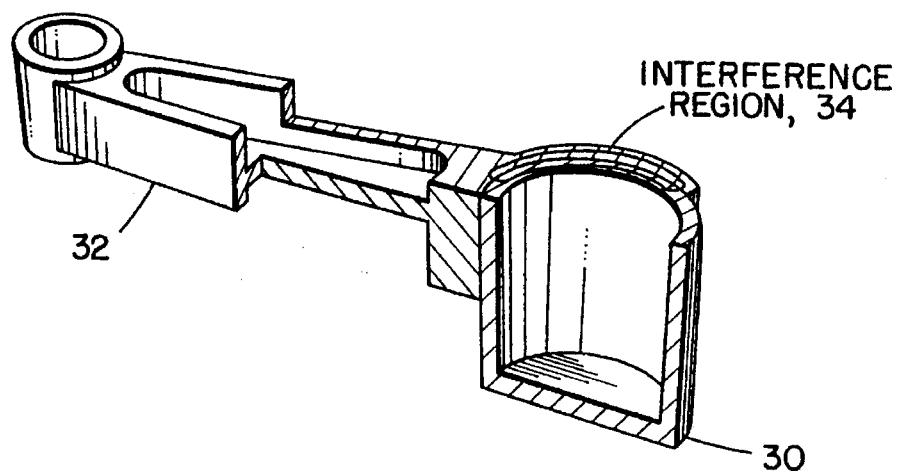
FIG. 2b illustrates the use of a solid-clipping technique, in combination with a surface clipping technique, that hatches and shades each cross-section of the solids, to visualize the interior of the mechanical assembly of FIG. 2a, and further illustrates the highlighting of a detected interference region.

FIG. 2b illustrates the use of a solid-clipping technique, in combination with a surface clipping technique, to hatch and shade each cross-section of the solids so as to visualize the interior of the mechanical assembly of FIG. 2a. In accordance with an aspect of the invention, an interference region 34 is displayed in a visually distinct and highlighted manner, such as by the use of color, so as to visualize the region where the cylinder 30 and connecting rod 32 interfere. The portion of the mechanical assembly removed by the cut-volume may be displayed in transparent mode.

Figure 2C:
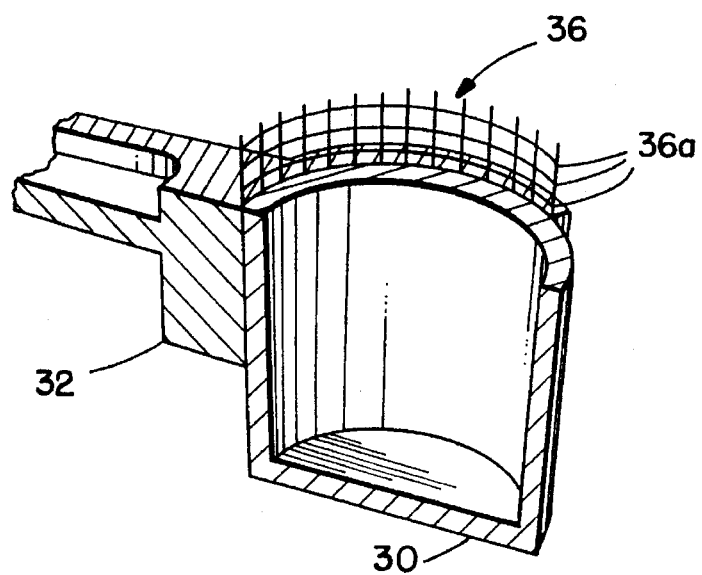
FIG. 2c shows an enlarged view of a portion of FIG. 2b, and illustrates a further aspect of the invention wherein the interference visualization technique of FIG. 2b is further enhanced by the display of stacks of parallel cross-sections through a three dimensional interference region 36.

FIG. 2c shows an enlarged view of a portion of FIG. 2b, and illustrates a further aspect of the invention wherein the interference visualization technique of FIG. 2b is enhanced by the display of stacks of parallel cross-sections 36a through a three dimensional interference region 36. As in FIG. 2b, the interference region 36 is displayed in a highlighted manner, such as by the use of color.

There will first be described an extension of the solid-clipping technique to highlight interferences in the cross-sections, as in FIGS. 2b and 2c. There will then be described a technique for automatically locating the beginning of interference regions along a user-specified search direction. This search facility is used interactively for two purposes. A first purpose is to quickly and reliably establish that a particular region is free of interferences. A second purpose is to automatically locate a first interference region and to automatically position the clipping plane at the beginning of the interference region so as to facilitate the visual inspection of the extent of the interference. Subsequent interferences are located automatically by starting the search past the current interference region.

As seen in FIG. 2c, using several parallel cross-section planes 36a and only rendering the interference regions, stacks of 2D slices through the interference region 36 are produced. When aligned along two orthogonal directions in the cut-volume, these stacks may be rendered in a transparent mode to indicate the extent and the general form of the interference regions and to guide more precise exploration through the interactive motions of the cut-volume. As was stated, usually a mechanical assembly should be free from interferences, but may contain lower-dimensional contact regions between the constituent components.

One conventional method to produce a solid clipped image of a type shown in FIG. 2b (exclusive of the interference region highlighting) is to perform the Boolean difference operation between the solids and the cut-volume and to display the result. An improved approach combines surface clipping with the display of cross-sections computed as the geometric intersection of the solid with a plane. A Constructive Solid Geometry (CSG) formulation of the result may also be used with special-purpose direct CSG rendering hardware. In this regard reference can be made to a paper entitled "Z-buffer Rendering from CSG: The Trickle Algorithm", David Epstein, Frederik Jansen, and Jarek Rossignac, Research Report, RC 15182, IBM T. J. Watson Research Center, Yorktown Heights, N.Y. (12/90), and also to a paper entitled "Correct Shading of Regularized CSG Solids Using a Depth-Inteal Buffer", by Jarek Rossignac and Jeffery Wu, Eurographics Workshop on Graphics Hardware, Laussanne, Switzerland (9/90).

The method to be described provides an alternative which does not require the hardware used for efficiently rendering CSG models. The method also does not require complex geometric intersection calculations. The method operates with any boundary representation for solids, provided that the scan-conversion method used by the Scan Conversion unit 20 satisfies the following parity condition.

Parity Condition: When the entire solid fits between the front and the back clipping planes, each pixel is visited an even number of times during the scan-conversion of the faces of the solid.

To establish which points of a clipping plane lie inside any given solid, the following property is utilized:

A point Q lies inside a bounded solid S if and only if Q is not on the boundary of S, and if a semi-infinite line (ray) starting at Q intersects the boundary of S at an odd number of isolated transversal intersection points.

In that the result is independent of the direction for the ray, the viewing direction may be used. By example, if the location of Q is stored in the z-buffer 22b as Z(q), then Z(q) represents the depth of the pixel q corresponding to the projection of Q onto the screen 16a. Then:

Q lies in the interior of S if and only if the number of times q is visited during the scan-conversion of the faces of S, with a depth greater than Z(q), is odd. Furthermore:

A point Q, projecting on a pixel q and lying on a clipping plane C, is inside a solid S if an only if q is visited an odd number of times while scan-converting the faces of S after they have been clipped using C.

It can be noted that all points Q of C that correspond to pixels of the screen 16a may be classified during a single pass over S. The above property can be employed to construct a pixel mask (one bit per pixel), Mp, for the cross-section region where the clipping plane intersects any given solid.

Figure 7:
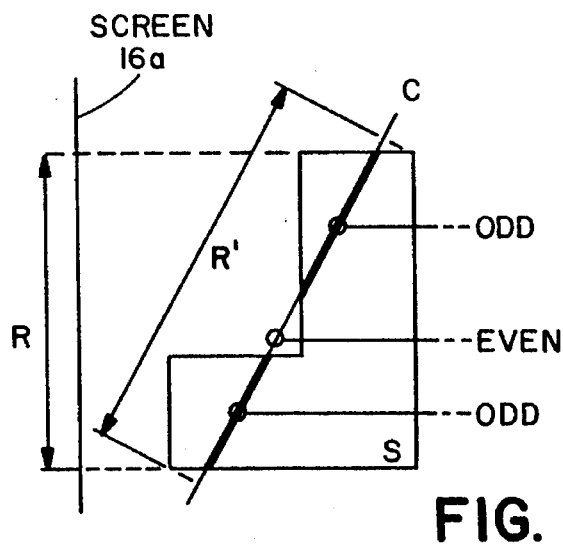
FIG. 7 illustrates a parity-based pixel mask construction technique.

As shown in FIG. 7, the pixel-mask Mp for the intersection of clipping plane C with a Solid S is determined by toggling the mask during the scan conversion of the faces of S that lie behind C. R is the projection of S onto the screen 16a, and R' the projection of S onto C.

When the outward normal of a cut-volume face points away from the viewer, it corresponds to a potential front face of the solid resulting from the cut. Therefore, the term "front clipping plane" is used when referring to the planes containing such a back face of the cut-volume. Only the cross-sections of the clipping planes need be filled, because other (back) clipping planes are never visible.

To make the classification results consistent with the conventional mathematical definition of the regularized difference between the original solid and the cut-volume, the clipping of faces coincident with the clipping plane is performed using a "less than" depth test for clipping planes, and a "less than or equal" depth-test otherwise.

This technique assumes that the solids are not clipped by the back plane of the viewing volume. If the depth span of the object is known, it suffices to temporarily adjust the location of the back plane. The perspective may also be set such that the back plane coincides with the horizon so as to guarantee that no object is clipped by the back clipping-plane.

Figure 9:
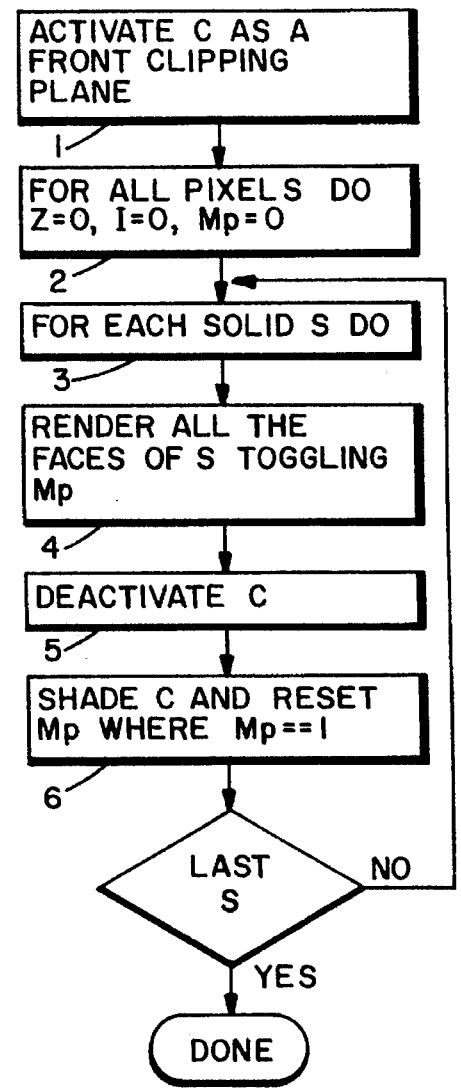
FIG. 9 is a flow chart that illustrates a single-plane solid-clipping method.

A method for rendering assemblies clipped by a cut-volume composed of a single half-space is presented below. The method renders the cross-section through each solid using the color (surface properties) of that solid. If C is a back clipping plane, a standard surface clipping approach may be used, otherwise, the following technique, also shown in the flow chart of FIG. 9, is employed:

| Single-plane solid-clipping: |
| --- |
| 01  Activate C as a front clipping plane |
| 02  For all pixels do Z=0, I=0, Mp=0 |
| 03  For each solid S do |
| 04      Render all the faces of S toggling Mp |
| 05      Deactivate C |
| 06      Shade C and reset Mp where Mp==1 |

Step 02 resets the z-buffer 22b (Z), the frame (intensity) buffer 22a (I), and the pixel mask (Mp). During the rendering of the faces of S (Step 04), the portions cut away by C or by the clipping planes of the viewing volume are discarded. The remaining portions are scan-converted and for each surface point S projecting on some pixel Q, the following operations are performed: (1) toggle the parity mask Mp(q), (2) if the depth of S is smaller than the depth stored at q, update the z-buffer 22b and the frame buffer 22a at q. It should be noted that both the front and the back faces of S are scan-converted for the pixel mask computation, although only the front faces need to be rendered.

The cross-section filling of line 06 is performed, using the color and surface properties of S, so as to distinguish the contribution of each solid to the cross-section. C is deactivated (Step 05) to prevent self-clipping.

A conventional depth-test for hidden surface removal is used during the rendering of the faces of S (Line 04) and of the cross-section C (Step 06) to ensure that only visible faces in a scene are rendered. Consequently, convex cut-volumes may be produced using several passes through this method for different clipping planes.

To render the cross-section using standard scan-conversion with hidden-surface removal, a suitable face $F_c$ on C is constructed. As the clipping plane C is manipulated interactively, $F_c$ is adjusted to always contain the cross-section area. A rectangle is used in C that encloses the orthogonal projection, R', of S onto C. In this regard reference is again made to FIG. 7.

Polyhedral cut-volumes having concave edges defined as arbitrary Boolean combinations of half-spaces may be used to better expose the internal structure of some assemblies. As such, the following description presents an extension of the solid-clipping technique for such cut-volumes.

Although the metaphor of a "cut-volume", v that is interactively manipulated by the designer to remove obstructing portions of the assembly, may be more intuitive than the notion of a "clipping volume", v', that is used to delimit the assembly through an intersection operation, both formulations are equivalent. That is, since v' is the complement $\bar{v}$ of v, for any solid S, $S-v=S\eta v'$.

Given a Boolean expression of v, it is straightforward to extract a disjunctive form for v'. For example, if linear half-space volumes are denoted $v_i$, the cut-volume $v=(v_1 \upsilon v_2)\eta(v_3 \upsilon v_4)$ yields the following disjunctive form of two products: $(\bar{v}_1 \eta \bar{v}_2) \upsilon (\bar{v}_3 \eta \bar{v}_4)$ for v'.

Figure 10:
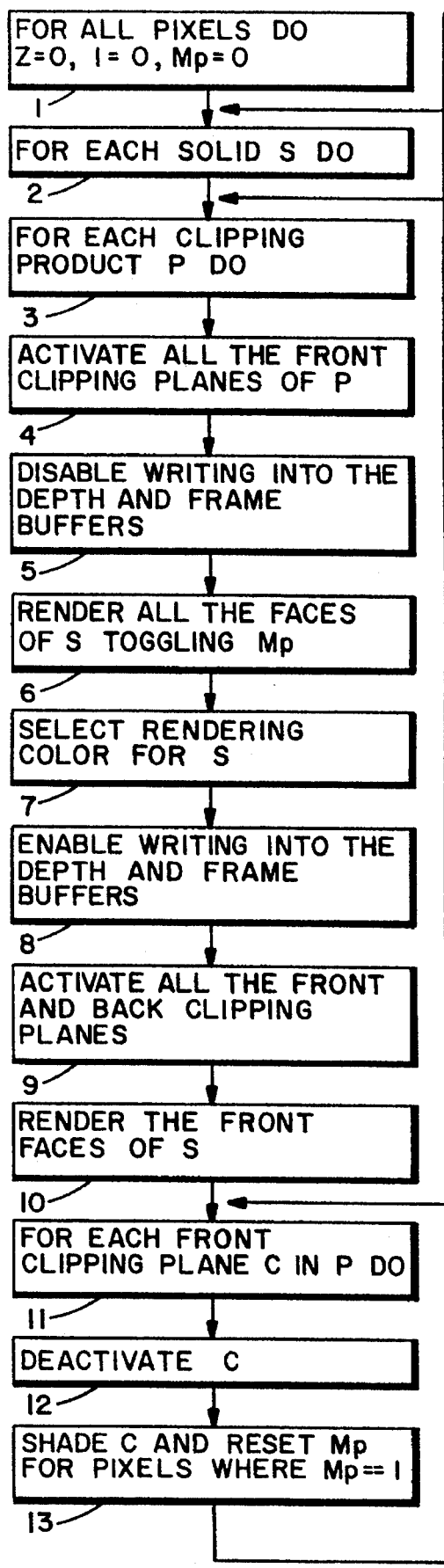
FIG. 10 is a flow chart that illustrates a solid-clipping method for a clipping-product.
Figure 10:
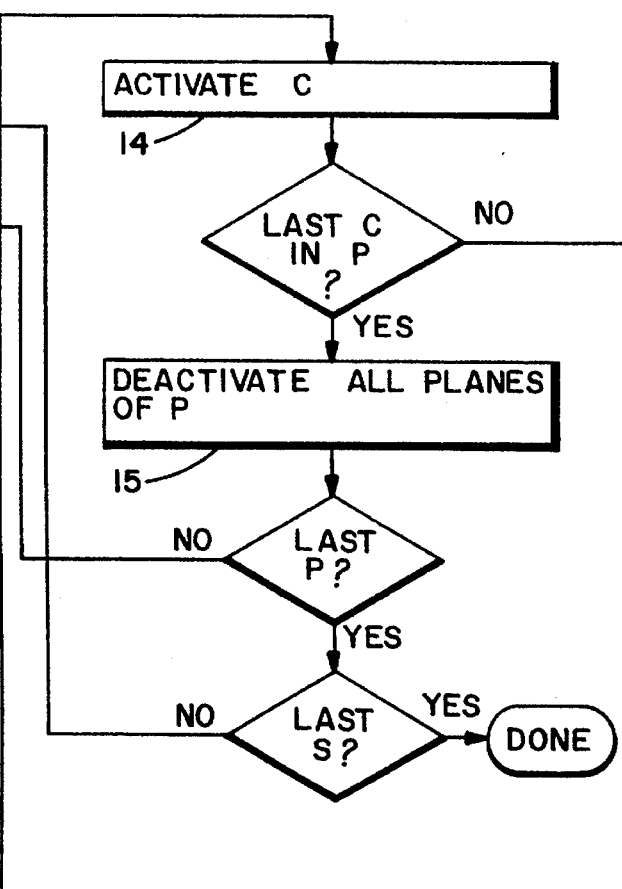

The intersections of S with these convex clipping-products are processed one-by-one using the method set forth below and shown in the flow chart of FIG. 10. The image of the union of these intersections is composed through the use of a conventional z-buffer test.

| Solid-Clipping Method for a Clipping-Product |
| --- |
| 01  For all pixels do Z=0, I=0, Mp=0 |
| 02  For each solid S do |
| 03      For each clipping-product P do |
| 04          Activate all the front clipping planes of P |
| 05          Disable writing into the depth and frame buffers |
| 06          Render all the faces of S toggling Mp |
| 07          Select rendering color for S |
| 08          Enable writing into the depth and frame buffers |
| 09          Activate all the front and back clipping planes |
| 10          Render the front faces of S |
| 11          For each front clipping plane C in P do |
| 12              Deactivate C |
| 13              Shade C and reset Mp for pixels where Mp==1 |
| 14              Activate C |
| 15          Deactivate all planes of P |

In Step 06, the front and back faces of S are clipped against all the front clipping planes of a product and then scan-converted. Each time a pixel q is visited during that scan-conversion, its mask bit Mp(q) is toggled. The frame buffer 22a and z-buffer 22b are not updated during that scan-conversion (Step 05). After the execution of Step 06, the mask Mp corresponds to a cut-volume composed of only the front cutting planes of that product.

Figure 8:
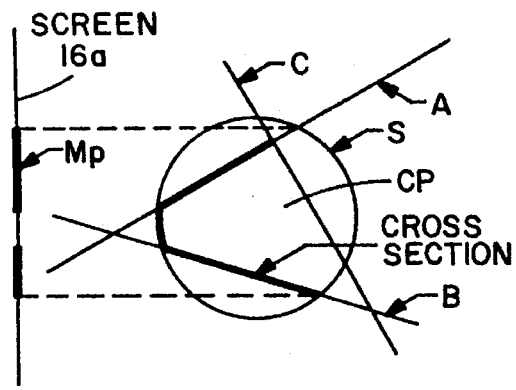
FIG. 8 illustrates pixel masking for a clipping-product.

More specifically, and referring to FIG. 8, two front clipping planes A and B and one back clipping plane C bound a clipping-product (CP). Mp is constructed by scan-converting the solid S clipped by A and B. The visible cross-sections are obtained by rendering A (clipped to B and C) and B (clipped to A and C) over those pixels where Mp is 1.

When the cross-sections are displayed for that product (Step 13), the mask Mp is used in conjunction with the other front and back clipping planes to delimit the contribution of each front clipping plane.

Each front clipping plane is temporarily deactivated (Step 12) prior to display (Step 13) to avoid self-clipping. The portions of the front faces of S that lie within the clipping-product, and that are not hidden by previously rendered objects, are rendered into the z-buffer 22b and the frame buffer 22a (Step 10). The rendering in Step 13 is performed using the standard z-buffer test.

An efficient implementation of the solid-clipping with composite cut-volumes requires: (1) the z-buffer 22b, (2) an application-controlled set of clipping planes, (3) one bit-plane for storing the mask Mp, and (4) facilities for programming the scan-conversion so as to toggle the Mp bit-plane for each surface point and to use the mask Mp as a condition for rendering. These facilities are supported by many commercially available graphics hardware systems for a limited number of application-controlled clipping planes.

Figure 3:
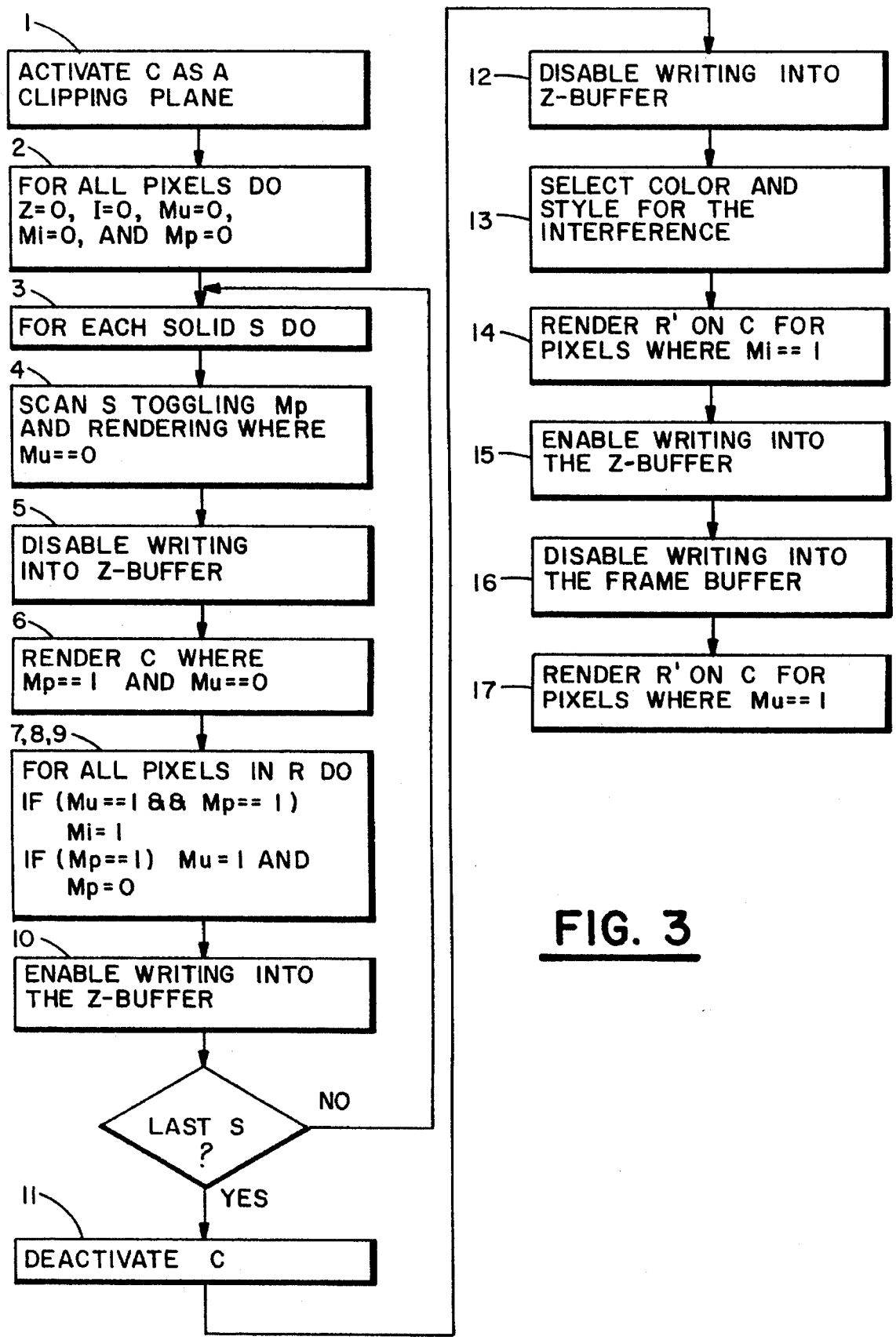
FIG. 3 is a flow chart that illustrates a method for highlighting an interference region.

Having described presently preferred techniques for both single-plane clipping and solid-clipping for a clipping-product, a description is now made of a presently preferred method for highlighting an interference for a cut-volume that is restricted to a single front clipping plane C, as in FIG. 7, as opposed to the multiple clipping planes that are employed in FIG. 8. The successive steps are illustrated in the flow chart of FIG. 3.

In general, the method determines the parity pixel mask Mp for the cross-section of a current solid S, as described above. The method furthermore also determines a cumulative pixel mask (Mu) for the union of the cross-sections of all previously processed solids, and also determines an intersection pixel mask (Mi). The cross-section of the solid, restricted to Mp–Mu, is rendered with the solid's colors. The interference region is rendered subsequently in a highlighted mode over Mi. The flow chart of FIG. 3 has blocks that correspond to the step numbers set forth below.

| Method for Highlighting Interferences: |
| --- |
| 01 Activate C as a clipping plane |
| 02 For all pixels do Z=0, I=0, Mu=0, Mi=0 and Mp=0 |
| 03 For each solid S do |
| 04     Scan S toggling Mp and rendering where Mu==0 |
| 05     Disable writing into z-buffer |
| 06     Render C where Mp==1 and Mu==0 |
| 07     For all pixels in R do |
| 08         If (Mu==1 && Mp==1) Mi=1 |
| 09         If (Mp==1) Mu=1 and Mp=0 |
| 10     Enable writing into the z-buffer |
| 11 Deactivate C |
| 12 Disable writing into z-buffer |
| 13 Select color and style for the interference |
| 14 Render R' on C for pixels where Mi==1 |
| 15 Enable writing into the z-buffer |
| 16 Disable writing into the frame buffer |
| 17 Render R' on C for pixels where Mu==1 |

In Step 04, all of the front and back faces of S are clipped by C and then scan-converted. For each access to a pixel during that scan-conversion, the pixel's mask, Mp, is toggled. Furthermore, if at that pixel the mask Mu is not set, the z-buffer 22b and frame buffer 22a are updated. It should be noted that this update is not necessary for the back faces of S. The testing of Mu prior to update avoids overwriting previously computed cross-sections for which the z-buffer has not yet been properly set.

In Step 06, the R' portion of C is rendered over pixels in the Mp mask, but out of the Mu mask so as to fill the cross-section contribution of S. However, the z-buffer 22b is not yet updated to the cross-section depth, thus avoiding a depth-conflict when filling in the interference region at Step 14. The z-buffer 22b is correctly set in Step 17, without altering previously computed colors in the frame buffer 22a. This technique of delaying the update of the z-buffer 22b is employed to ensure that when the interference area of the cross-section is filled, the surface depth is not compared to previously computed z-values from pixels on the same cross-sectioning plane. Such comparisons, when performed with limited numeric accuracy, have been found to produce inconsistent pixel colors across the overlap area.

The clipping plane is then scan-converted into the frame buffer 22a. Regions of interference are marked in, by example, red. The clipping plane is also scan-converted into the depth buffer 22b.

Reference is now made to FIGS. 6a–6f for a further description of the interference highlighting method described above and shown in FIG. 3. In FIGS. 6a–6f a two-dimensional slice through the scene is used to explain the steps of the interference highlighting method. Two interfering solids A and B are intersected by the clipping plane C. In the drawing the contents of the z-buffer 22b is indicated by the thin horizontal lines. The contents of the pixel-masks Mi, Mu and Mp are shown with the thin vertical lines on the left. Asserted bits in the pixel masks are indicated by heavier vertical lines that are superimposed on the thinner vertical lines. The contents of the frame buffer 22a is indicated within the vertical window. The projecting lines from the contours of A, B, or C indicate, for each pixel, which surface has contributed to the frame buffer 22a.

Figure 6A:
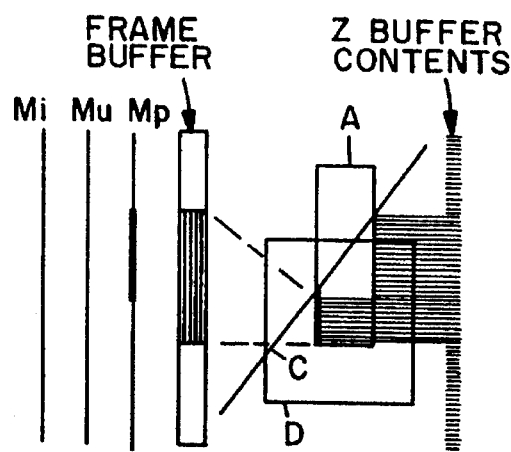
FIGS. 6a–6f illustrate the method of interference highlight construction for two solids A and B that are intersected by a clipping plane C.
Figure 6B:
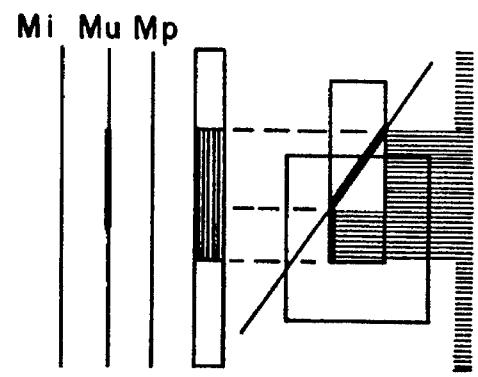
Figure 6C:
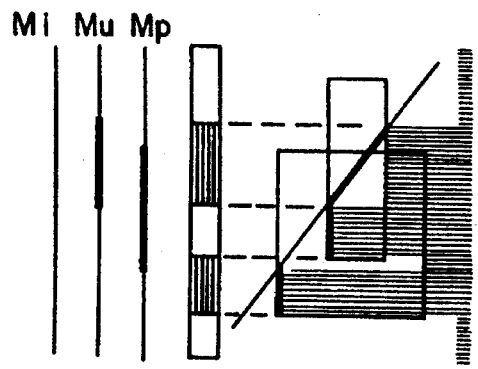
Figure 6D:
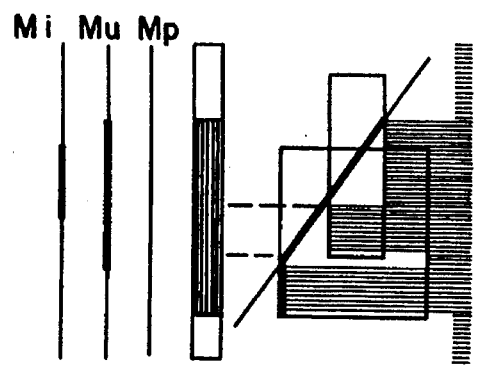
Figure 6E:
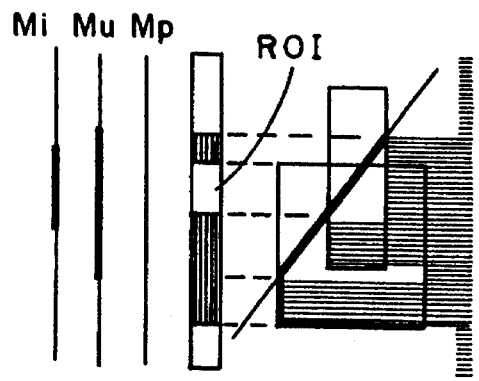
Figure 6F:
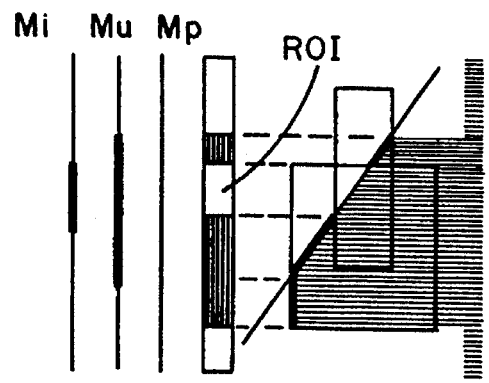

In FIG. 6a, Solid A is scan-converted into the frame buffer 22a and the z-buffer 22b and the parity pixel mask is constructed in Mp. In FIG. 6b the contents of Mp is unioned into Mu. In FIG. 6c the Solid B is scan-converted into the frame buffer 22a and the z-buffer 22b, and the parity pixel mask is constructed in Mp. In FIG. 6d Mi is asserted where Mp and Mu overlap, and the contents of Mp is unioned into Mu. In FIG. 6e the clipping plane C is scan-converted into the frame buffer 22a, and regions of interference (ROI) are highlighted, such as being displayed with the color red. In FIG. 6f the clipping plane C is scan converted into the z-buffer 22b.

A method for rendering only the interference portion, i.e. the cross-section where the mask Mi is set, is obtained by eliminating the shading operations of Steps 04, 7, and 17, and thus produces the interference stacks 36a of FIG. 2c.

Locating Interference Regions

As was described above, an aspect of this invention is the automatic detection and location of interferences and contacts along a user-defined search direction, and within a given search interval.

The search direction is considered to be orthogonal to the cross-sectioning plane C. The search interval is confined to a slice between C and another plane C' that is parallel to C. The location of C' may be specified by the user, or computed automatically from a bounding box having x,y,z corner coordinates corresponding to minimum and maximum x,y,z coordinates of an assembly, so as to extend past the entire assembly. The positions of C and C' are indicated by starting and ending parameters $Z_s$ and $Z_e$, respectively, along a search direction D.

The use of a stack of parallel cross-sections evenly distributed between $Z_s$ and $Z_e$, and testing to determine if any of the cross-sections contains an interference region, will not guarantee the detection of interferences, since these may occur between two consecutive cross-sections. The cost of testing a sufficient number of cross-sections to reduce the size (in depth) of possibly missed interferences may be prohibitive.

The method of the invention instead uses a procedure "IntersectionFreeSlice" to determine a sufficient, but not necessary condition, for interference. If the result is negative, the designer may be reassured immediately that a region is free of interference. Otherwise, the following method recursively subdivides the search interval ($Z_s$, $Z_e$) until a predetermined maximum level (i.e. minimal slice thickness), L, is reached (in which case, the beginning of a possible interference region is returned) or until all branches of a search tree that correspond to a positive test result have been explored (in which case there is no interference and $Z_e$ is returned). The minimal slice thickness, the depth resolution, and the z-scaling factors control the accuracy of the test and define the ability to differentiate between interference and contact.

Figure 4:
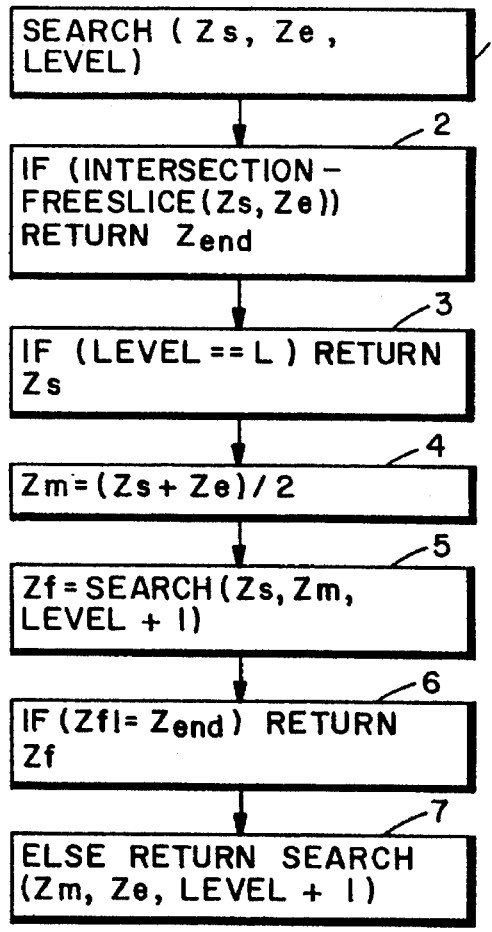
FIG. 4 is a flow chart that illustrates a method for determining an interval location.

The following describes a presently preferred method for determining interval location. The blocks of the flow chart of FIG. 4 are numbered in accordance with the Step numbers below.

| Method for Interval Location: |
|---|
| 01 Search (Zs, Ze, level) |
| 02      If (IntersectionFreeSlice (Zs,Ze)) return $Z_{end}$ |
| 03      If (level==L) return Zs |
| 04      Zm=(Zs+Ze)/2 |
| 05      Zf=Search(Zs,Zm,level+1) |
| 06      If (Zf!=$Z_{end}$) return Zf |
| 07      Else return Search (Zm,Ze,level+1) |

The direction of search is arbitrary and several directions may be used. The search interval may be automatically initialized to contain the entire assembly, or may be initialized to contain only a portion of the assembly.

A bounding box around a discovered interference may be used to locate and highlight the potential interference region. The clipping plane C is automatically placed at the beginning of that interal by the application. As a result, the user can inspect the area, then move C past the current interference, and then resume the search.

The "IntersectionFreeSlice" test is implemented by the following method by generating the pixel mask Mp for the projection of the intersection of the current solid S with the slice, and by testing if the Mp mask intersects the Mu mask for the union of the projection of previously processed solids. The approach is based on the following property.

Property: If the projections of the slices through the solids are disjoint, there is no interference within the slice.

Figure 5:
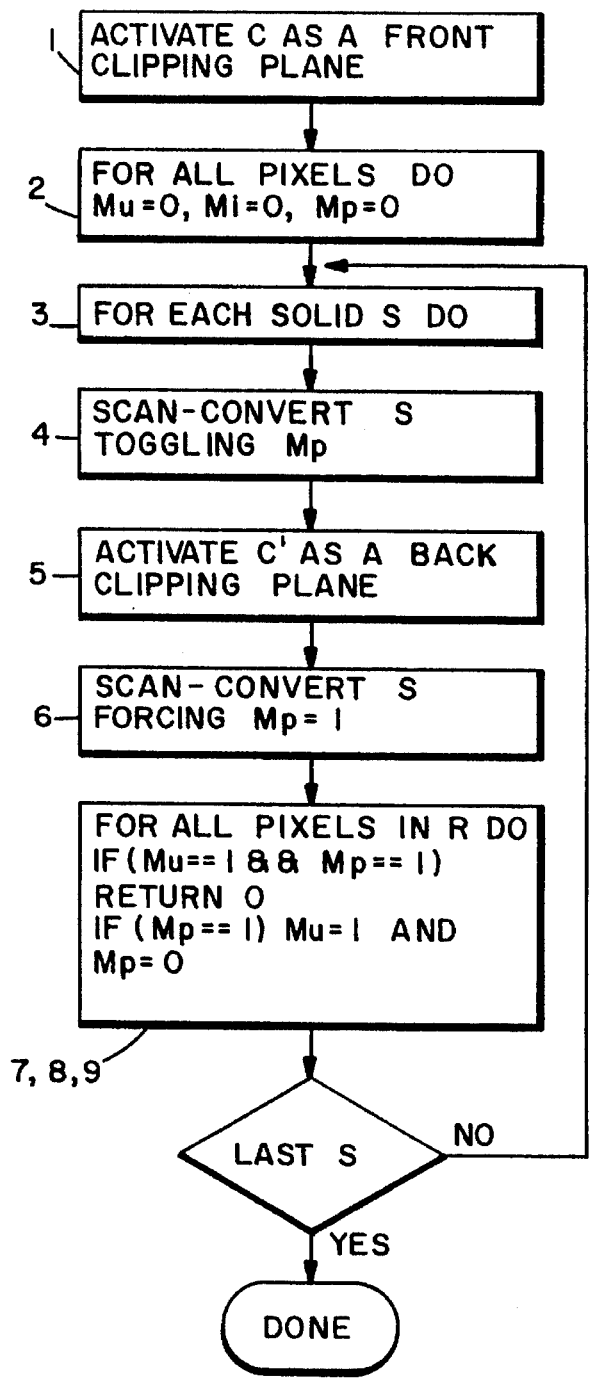
FIG. 5 is a flow chart that illustrates a routine for determining an intersection free slice of an object.

The following describes a presently preferred method for implementing the "IntersectionFreeSlice" test. The blocks of the flow chart of FIG. 5 are numbered in accordance with the Step numbers below.

| IntersectionFreeSlice: |
|---|
| 01 Activate C as a front clipping plane |
| 02 For all pixels do Mu=0, Mi=0, Mp=0 |
| 03 For each solid S do |
| 04      Scan-convert S toggling Mp |
| 05      Activate C' as a back clipping plane |
| 06      Scan-convert S forcing Mp=1 |
| 07      For all pixels in R do |
| 08          If (Mu==1 && Mp==1) return 0 |
| 09          If (Mp==1) Mu=1 and Mp=0 |

A further aspect of this invention detects those situations where a slice is free from interferences, but where the projections of the components overlap. The projections' interference test is replaced with a finer disjointness test. Given two constituent solids, the disjointness test checks at each pixel whether, within the slice, one constituent is entirely in front of the other constituent. If this is the case for all pixels, the two solids do not interfere within the slice. The disjointness test is performed using extensions to a depth-buffer approach to hidden-surface removal. Namely, if at a given pixel the furthest (along a given direction) point of one solid, within the slice, is in front of the closest point of the other solid, the two solids are disjoint for that pixel.

More specifically, a variation of the IntersectionFreeSlice test set forth above provides improvements in interference detection for the case of disjoint solids having parallel faces that almost touch. The variation is employed for those pixels where both Mu and Mp are asserted (Step 8).

Figure 11A:
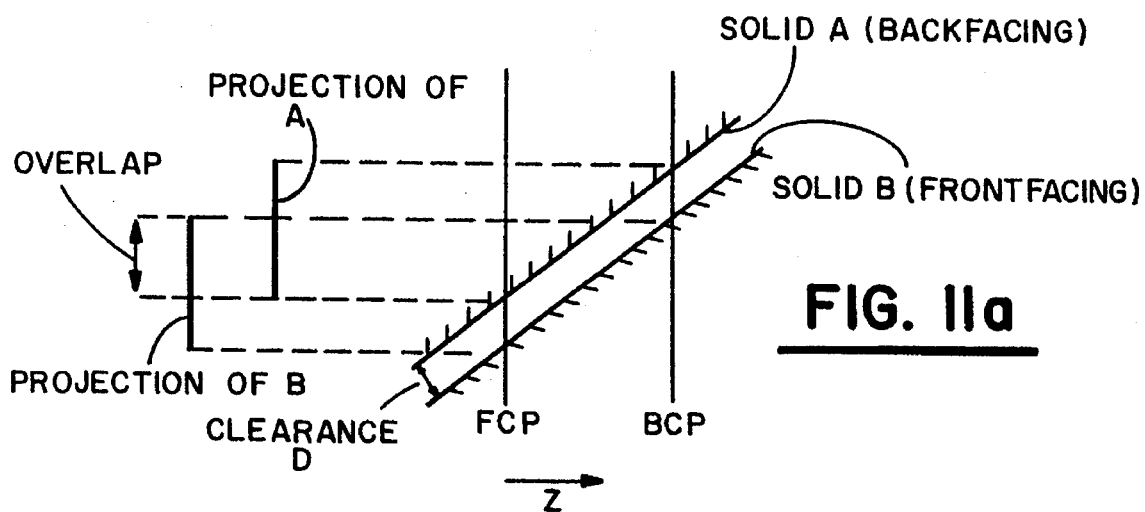
FIGS. 11a–11d each illustrate the operation of a disjointness test for various conditions resulting from multiple faces within a slice.
Figure 11B:
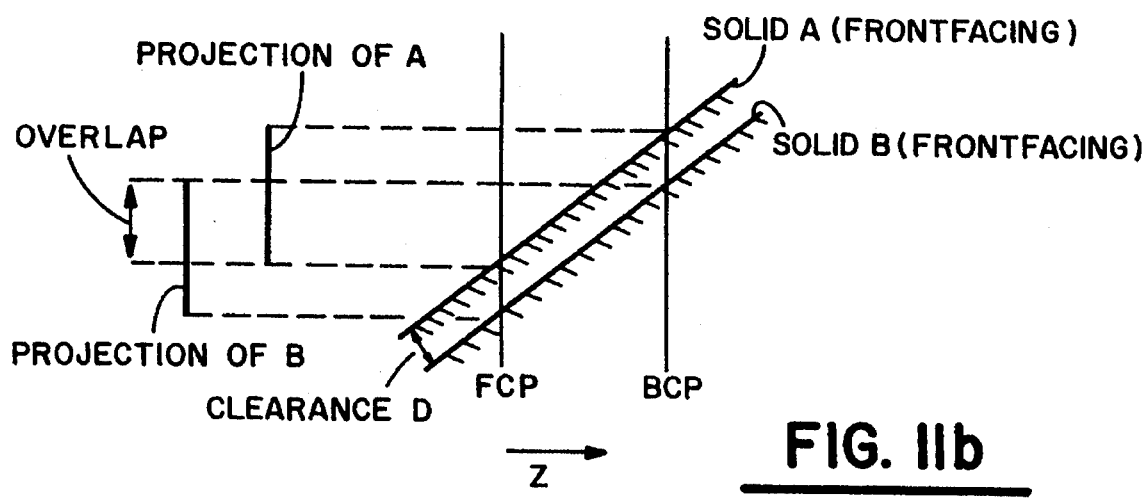
Figure 11C:
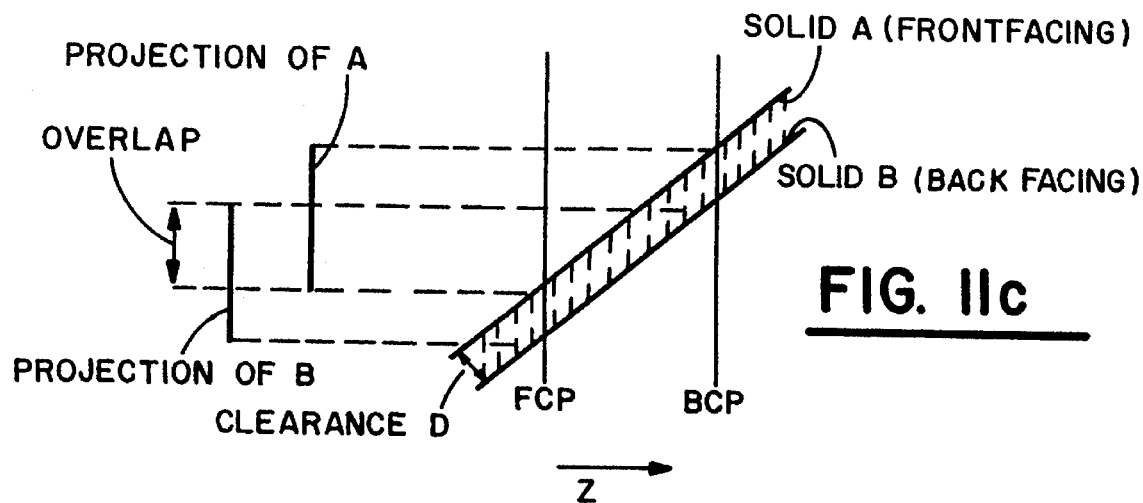
Figure 11D:
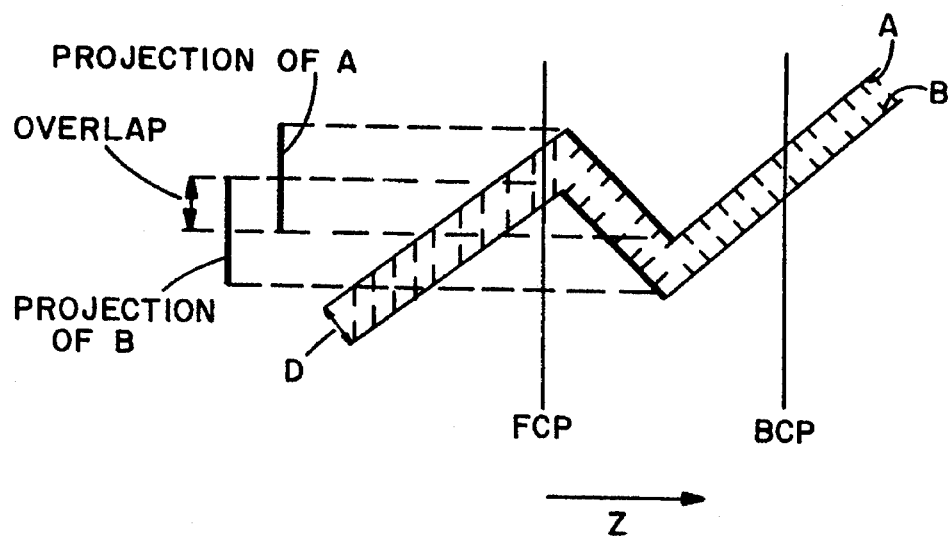

Reference is made to FIGS. 11a–11d for the ensuing discussion. Specifically, FIG. 11a illustrates a no interference condition for a back-facing face of a solid A and a front-facing face of a solid B ($Z_A<Z_B$) within a slice bounded by a front clipping plane and a back clipping plane; FIG. 11b illustrates an interference condition for a front-facing face of a solid A and a front-facing face of a solid B; FIG. 11c illustrates an interference condition for a front-facing face of a solid A and a back-facing face of a solid B ($Z_A<Z_B$); and FIG. 11d illustrates a potential interference condition for a condition wherein there are more than two faces per slice. In FIG. 11d the disjointness test is not applicable in that there is no unique sorting in the z-axis dimension of the solids A and B.

In FIGS. 11a–11d it is assumed that two solids A and B have a small clearance along two large parallel faces. The clearance, D, is the distance between the two planes along their common normal vector. When the projection of that distance on the Z-direction (i.e. D multiplied by the Z-component of the plane's normal) is smaller than the depth of a slice, the projections of the portions of A and B inside the slice interfere. As such, the method is unable able to determine whether the two solids are interfering without further subdivision.

If the projection of D is smaller than the depth of all the slices but the thinnest, the method will detect that A and B do not interfere. Further subdivision of all of the slices to their maximum level of resolution can be performed to insure that no interference is missed. However, this additional computing effort can, in certain cases, be made unnecessary by the improvement described below. Specifically, the approach described operates well when, at each pixel, there is only one face of A and one face of B within the slice.

Instead of testing whether the projections of A and B that are restricted to the current slice interfere, a test is performed to determine whether, at each pixel, A lies behind B in that slice (or inversely, B lies behind A). To accomplish this test, select the first face of A within the slice and determine whether the face is front facing or back facing.

It is first assumed that the face of A is front facing. For this case, the rest of the faces of A are displayed and the pixels are marked where there is more than one such face. Now, while displaying B, mark the pixels where B has a front face, and mark the pixels where a face of B lies behind the faces of A. A depth test is used for detecting such situations. If any pixel has been marked, it cannot be guaranteed that A and B are disjoint within that slice.

When the first face of A is back facing, the method marks those pixels where there is more than one face of A. But, while displaying B, marks instead those pixels where B has a back face, and also marks those pixels where a face of B lies in front of the faces of A. Again, if any pixel has been marked, it cannot be guaranteed that A and B are disjoint within that slice.

This extension to the method results in significant performance improvements for finding interferences within assemblies with numerous, almost touching, parts.

Furthermore, introducing a depth tolerance into the depth tests enables the method to discard contact regions where A and B touch along a portion of their faces. The use of a depth tolerance is discussed at page 5 in the above referenced article entitled "Z-Buffer Rendering From CSG: The Trickle Algorithm" by D. A. Epstein et al.

This technique is not limited for use with only two solids. In practice, the processing for B may be repeated for other solids.

To implement the enhancement described above, additional per-pixel storage is required to store the z-values and the orientation of the contributing faces.

To avoid missing thin interferences that fall between pixels, it has been found to be advantageous, when shading a solid, to draw the edges of each solid with lines having a thickness or width of at least three pixels. Each edge is drawn twice to maintain the parity condition, preferably by drawing the edges of each face after shading the face. Consequently, when the projections of two objects are one pixel apart, the additional edge drawing creates overlapping projections.

To distinguish contact regions from true interferences, a two-dimensional discretized morphological shrinking operation, i.e. a 3×3 filter over all pixels, is applied to the mask Mi so as to remove interferences that are thinner than two pixels.

By acting on a scaling factor (i.e. the space distance corresponding to the inter-pixel resolution), the thresholds are adjusted between clearance, non-invasive contact, and true interference conditions. By performing the "IntersectionFreeSlice" test twice (once with drawing the edges and once with eroding the mask) the method distinguishes clearance (if both test return false), from contacts (if the results of both tests are different), from interferences (if both tests return true). However, it should be noted that searching true interferences (through mask erosion) for regions with oblique contact areas between overlapping faces of different objects forces the adaptive subdivision to visit all the branches of the search tree down to a depth corresponding to a slice thickness for which there is no interference between the projections of the solids.

The interference search automatically positions the cross-sectioning plane C at the beginning of a detected interference region. The user examines the interference by moving the viewpoint and the clipping plane with the pointing device 26. The interfering objects may be selected graphically and the corresponding CAD models which require engineering changes may be identified. Conventional graphics facilities for interactively hiding some models or for producing exploded views also aid in the decision of which of the interfering parts must be redesigned.

The search methods described above may require extensions to the functions supported by currently available graphics libraries, and may also require some hardware modifications. For example, Step 09 of the "IntersectionFreeSlice" method implies a feedback from the Graphics Buffer unit 22 to the application running in the Main CPU 12. This feedback path, shown as the Host Bus 28 in FIG. 1a, may already exist for reporting enclosing boxes around pixels traversed by the scan-conversion, but does not typically take into account any result of testing mask values for these pixels. This step may be accomplished by the application software, which must inspect each pixel of Mi. Similarly, the erosion operation may also be performed in software. However, if the Host Bus 28 is not employed for reporting results back to the application the effect on performance is not severe in that, except for regions where two or more objects are in contact, the search method only visits a few branches of the search tree, and thus requires the inspection of only a small number of pixel-masks within a limited domain (R).

Figure 1B:
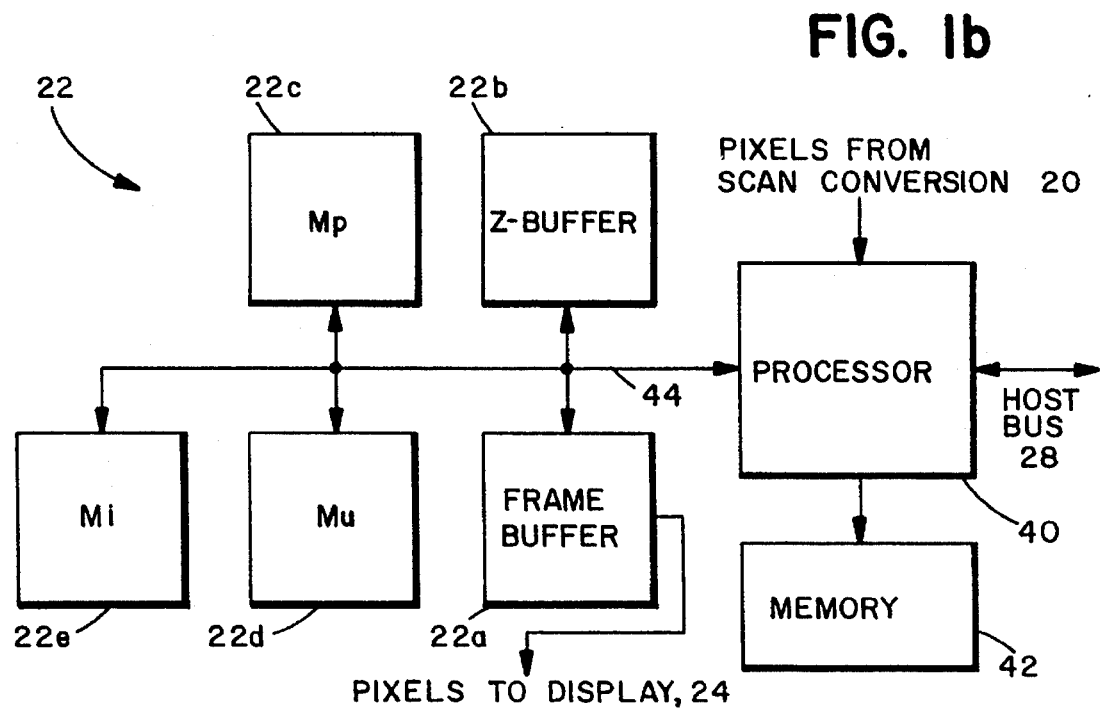

Reference is made to FIG. 1b for showing an embodiment of the Graphics Buffer unit 22. Associated therewith is a local processor 40 and a memory 42, the memory 42 storing instructions for implementing the teachings of the invention. A local bus 44 bidirectionally couples the processor 40 to the frame buffer 22a and the z-buffer 22b. Also coupled to the local bus 44 are is the Mp bit plane 22c, the Mu bit plane 22d, and the Mi bit plane 22e. As was noted above, when implementing the disjointness test additional per-pixel storage is required to store the z-values and the orientation of the contributing faces.

The processor 40 receives pixels from the Scan Conversion unit 20, while the frame buffer 22a provides pixels to the Display 24. During operation, the processor 40 works in conjunction with the Scan Conversion unit 20 so as to manage the pixel mask bit planes 22c, 22d and 22e for detecting interference regions and for rendering those regions in a visually distinct manner. The Host Bus 28 couples the processor 40 to the application running in the Main CPU 12 as described above.

The teaching of this invention has been described above in the context of methods for displaying cross-sections through solids with highlighted interference areas, and for automatically and/or manually moving or sweeping a cross-sectioning plane through the solids to detect interferences and contacts between solids. These methods provide interactive performance and provide visualization techniques to replace the conventional techniques for determining interferences, such as the construction of clay models.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A method for execution by a graphics processing system for detecting an interference between representations of solids, comprising the steps of:

positioning a cross-sectioning plane at locations within representations of at least two solids; and during the step of positioning, processing the representations of the solids by scan converting the representations to determine displayable faces of the solids and displaying the determined faces of the solids, including portions of the solids that are exposed by a current location of the cross-sectioning plane; wherein the step of processing includes the steps of detecting a region of interference between the representations of the at least two solids within a recursively subdivided search interval that has a non-zero extent along a depth axis, the step of detecting operating in accordance with a result of a disjointness test performed on projections of the solids within the search interval and, for a detected region of interference, displaying the detected region of interference in a manner that visually emphasizes the detected region of interference.

2. A method as set forth in claim 1 wherein the step of processing includes the steps of:

determining a starting location and an ending location of the search interval;

recursively subdividing the solids into a plurality of cross-sectional slices within the search interval; and responsive to the recursive subdivision of the solids, determining if projections of the solids within a slice onto a cross-sectioning plane that defines a boundary of the slice are disjoint and, if so, determining that there is no interference between the solids within the slice, else, if projections of the solids within the slice onto the cross-sectioning plane that defines the boundary of the slice are not disjoint, detecting that there is a region of potential interference between the solids within the slice.

3. A method as set forth in claim 2 and, in response to detecting that there is a region of potential interference between the solids, further including a step of positioning a cross-sectioning plane with respect to the detected potential region of interference.

4. A method for execution by a graphics processing system for detecting an interference between representations of solids, comprising the steps of:

responsive to an input, positioning a cross-sectioning plane at an initial location with respect to representations of at least two solids;

moving the cross-sectioning plane from the initial location through the representations of the least two solids; and during the step of moving, processing the representations of the solids by scan converting the representations to determine displayable faces of the solids and displaying the displayable faces of the solids, including portions of the solids that are exposed by a current location of the cross-sectioning plane; wherein the step of processing includes the steps of, detecting a region of interference between the representations of the at least two solids within a recursively sub-divided search interval that has a non-zero extent along a depth axis, the step of detecting operating in accordance with a result of a disjointness test performed on projections of the solids within the search interval;

for a detected region of interference, displaying the detected region of interference in a manner that visually emphasizes the detected region of interference; and positioning the cross-sectioning plane with respect to the detected region of interference.

5. A method for execution by a graphics processing system for detecting an interference between representations of solids and for displaying the interference on display means having a screen comprised of a plurality of pixels, comprising the steps of:

responsive to an input, activating a clipping plane C;

for all pixels, initializing a depth buffer (z-buffer), a frame buffer, and a plurality of pixel mask buffers (Mu, Mi, Mp);

for each solid S, performing the steps of, scanning S, toggling Mp and rendering into the frame buffer and z-buffer where Mu==0;

disable writing into the z-buffer;

rendering C where Mp==1 and Mu==0;

for all pixels in R, where R is a projection of S onto the screen, performing the steps of,
if (Mu==1 && Mp==1), then Mi=1; and
if (Mp==1), then Mu=1 and Mp=0;

enable writing into the z-buffer;

deactivating the clipping plane C;

disable writing into z-buffer;

selecting a visually distinct manner for displaying an interference;

for pixels where Mi==1, rendering into the frame buffer R' on C, where R' is a projection of S onto C, thereby displaying a region of interference in the visually distinct manner;

enable writing into the z-buffer;

disable writing into the frame buffer; and rendering R' on C for pixels where Mu==1, where == indicates a test for equality, and where && indicates a test for a logical AND.

6. A method for execution by a graphics processing system for detecting an interference between representations of solids and for displaying the interference on display means having a screen comprised of a plurality of pixels, comprising the steps of:

determining a search interval having a dimension defined along a depth axis by $Z_{start}$ (Zs) and $Z_{end}$ (Ze) along a search direction D, the search interval defining a cross-sectioning slice c encompassing all or a portion of representations of two solids, the search direction D having a predetermined orientation with the cross-sectioning slice C; and recursively subdividing the dimension along the depth axis of the search interval until an interference between the two solids is detected, or until a predetermined minimum dimension of the search interval along the depth axis is obtained; the step of recursively subdividing including, for each of the recursive subdivisions, a step of determining if projections of the solids within the slice onto a cross-sectioning plane that defines a boundary of the slice are disjoint and, if so, determining that there is no interference between the solids within the slice, else, if projections of the solids within the slice onto the cross-sectioning plane that defines the boundary of the slice are not disjoint, detecting that there is a potential region of interference between the solids within a region contained within the slice.

7. A method as set forth in claim 6 and further including a step of displaying a detected region of interference in a visually distinct manner.

8. A method as set forth in claim 7 wherein the step of displaying the detected region of interference includes a step of displaying at least a portion of each slice wherein a region of interference is detected.

9. A method as set forth in claim 6 and including an initial step of displaying the solids, the step of displaying including a step of rendering edges of the solids to have a width of a plurality of pixels.

10. A method as set forth in claim 6 and including an initial step of displaying the solids, and further including a step of applying a pixel filter to a potential region of interference to eliminate a potential interference region that is below a predetermined size determined by the pixel filter.

11. A method as set forth in claim 6 wherein the search direction D is orthogonal to the cross-sectioning slice C.

12. A graphics processing system for displaying representations of solids on display means having a screen comprised of a plurality of pixels, comprising:

means for determining a search interval having a dimension defined along a depth axis by $Z_{start}$ (Zs) and $Z_{end}$ (Ze) along a search direction D, the search interval defining a cross-sectioning slice C encompassing all or a portion of representations of two solids, the search direction D having a predetermined orientation with the cross-sectioning slice C; and means for recursively subdividing the dimension along the depth axis of the search interval until an interference between the two solids is detected, or until a predetermined minimum dimension of the search interval along the depth axis is obtained; said means for recursively subdividing including means, responsive to each of the recursive subdivisions, for determining if projections of the solids within the slice onto a cross-sectioning plane that defines a boundary of the slice are disjoint and, if so, for determining that there is no interference between the solids within the slice, else, if projections of the solids within the slice onto the cross-sectioning plane that defines the boundary of the slice are not disjoint, for detecting that there is a potential region of interference between the solids within a region contained within the slice.

13. A graphics processing system as set forth in claim 12 and further including means for displaying a detected region of interference in a visually distinct manner.

14. A graphics processing system as set forth in claim 13 wherein a detected region of interference is displayed as at least a portion of each slice wherein a region of interference is detected.

15. A graphics processing system as set forth in claim 12 and further including means for displaying the solids such that edges of the displayed solids have a width of a plurality of pixels.

16. A graphics processing system as set forth in claim 12 and further including means for applying a filter to a potential region of interference to eliminate a potential interference region that is below a predetermined size, in pixels, as determined by the filter.

17. A graphics processing system as set forth in claim 12 and further including means for positioning the cross-sectioning slice C at a location that corresponds to a boundary of a detected region of interference.

18. A graphics processing system as set forth in claim 12 and further comprising means for distinguishing a region wherein the two solids contact one another at surfaces thereof from a region wherein the two solids intersect.

19. In a graphics processing system for displaying representations of solids on display means having a screen comprised of a plurality of pixels, a method for determining if two solids interfere with one another, comprising the steps of:

determining a search interval having a dimension defined along a depth axis by $Z_{start}$ (Zs) and $Z_{end}$ (Ze) along a search direction D, the search interval defining a cross-sectioning slice c encompassing all or a portion of representations of two solids, the search direction D having a predetermined orientation with the cross-sectioning slice C; and recursively subdividing the dimension along the depth axis of the search interval until an interference between the two solids is detected, or until a predetermined minimum dimension of the search interval along the depth axis is obtained, wherein the step of recursively subdividing includes a step of, for a slice containing a face of a first solid and a face of a second solid, performing a disjointness test within the slice, the disjointness test including a determination of a z-axis ordering of points on the faces of the solids within the slice.

20. In a graphics processing system for representing in two dimensions three dimensional objects that are orientated in space, a method for determining if the objects interfere with one another, comprising the steps of:

sweeping a cross-sectioning slice having a predetermined non-zero thickness through the objects;

responsive to the cross-sectioning slice sweeping through the objects, determining if a first one of the objects interferes with another one of the objects within a region bounded by the slice in accordance with a result of a disjointness test performed on projections of the solids within the cross-sectioning slice, and if so, displaying in a visually distinct manner a detected region of interference, and positioning a cross-sectioning plane at a boundary of the detected region of interference to aid an operator in evaluating the detected region of interference.

21. A method for execution by a graphics processing system for detecting and displaying an interference between representations of solids, wherein the graphics processing system displays the representations of solids as a plurality of pixels, the method comprising the steps of:

defining a cross-sectioning plane within representations of at least two solids;

for each of said plurality of pixels to be displayed, storing in a display memory data defining portions of the representations of the at least two solids that are exposed by the cross-sectioning plane;

detecting a region of interference between the representations of the at least two solids within a recursively sub-divided search interval that has a non-zero extent along a depth axis, the step of detecting operating in accordance with a result of a disjointness test performed on projections of the solids within the search interval, and storing in a pixel mask buffer data defining the region of interference;

displaying the portions of the representations of the at least two solids according to the data stored in the display memory; and displaying the detected region of interference in a manner that visually emphasizes the detected region of interference according to the data stored in the pixel mask buffer.

* * * * *